United States Patent [19]

Robinson, Jr.

[11] Patent Number: 4,861,568

[45] Date of Patent: Aug. 29, 1989

[54] PROCESS FOR REMOVING SULFUR DIOXIDE FROM FLUE GASES

[76] Inventor: Melville W. Robinson, Jr., 2 Darlington Rd., Beaver Falls, Pa. 15010

[21] Appl. No.: 245,276

[22] Filed: Sep. 16, 1988

[51] Int. Cl.$^4$ .......................... C01B 17/00; B01J 8/00
[52] U.S. Cl. .................................. 423/243; 423/242; 423/244
[58] Field of Search ............... 423/242 A, 244 R, 243, 423/242 R, 244 A

[56] References Cited

U.S. PATENT DOCUMENTS

| | | | |
|---|---|---|---|
| 4,374,813 | 2/1983 | Chen et al. | 423/242 |
| 4,501,722 | 2/1985 | Ashley et al. | 423/242 |
| 4,519,995 | 5/1985 | Schrofelbauer | 423/244 |
| 4,555,391 | 11/1985 | Cyran et al. | 423/244 |
| 4,559,211 | 12/1985 | Feldman et al. | 423/242 |
| 4,623,523 | 11/1986 | Abrams et al. | 423/242 |
| 4,626,418 | 12/1986 | College et al. | 423/243 |
| 4,645,652 | 2/1987 | Kimura | 423/235 |
| 4,645,653 | 2/1987 | Kimura | 423/235 |
| 4,670,238 | 6/1987 | Yoon | 423/244 |

Primary Examiner—Gregory A. Heller
Attorney, Agent, or Firm—Parmelee, Miller, Welsh & Kratz

[57] ABSTRACT

Sulfur dioxide is removed from flue gases resulting from combustion of sulfur-containing coal in a coal combustion unit by contacting the gases in the coal combustion unit with hydrated lime containing sugars and then adding an aqueous media, preferably containing an alkali metal compound, to the gases in ductwork leading from the coal combustion unit to an electrostatic precipitator.

6 Claims, 1 Drawing Sheet

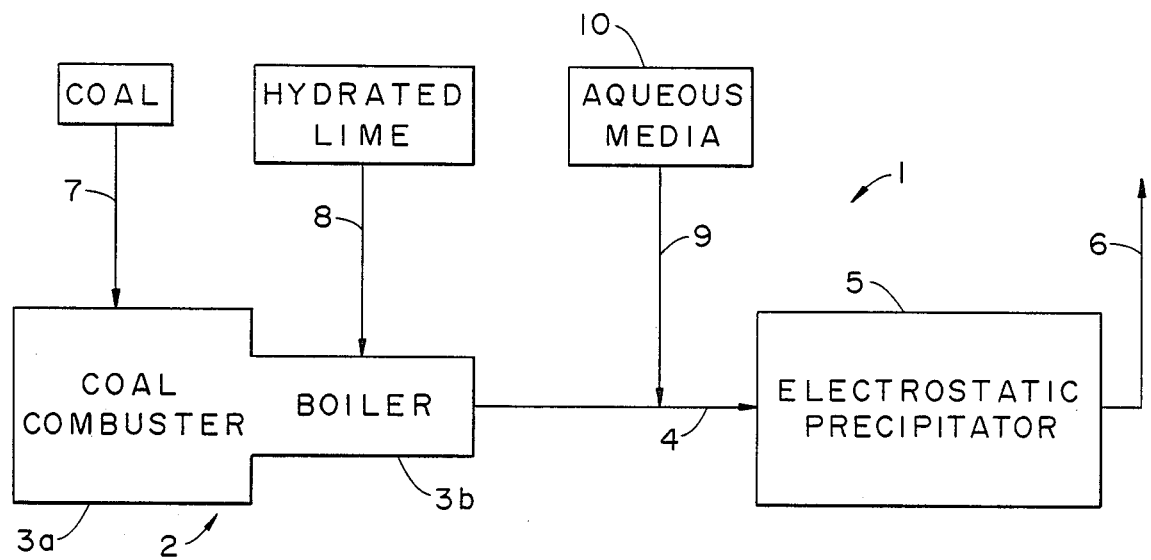

PROCESS FOR REMOVING SULFUR DIOXIDE FROM FLUE GASES

FIELD OF THE INVENTION

The present process relates to improved sulfur dioxide removal from coal combustion gases wherein a hydrated lime containing sugar is added to the combustion chamber of a coal combustion unit, and water, preferably containing an alkali metal compound, is added to the flue gases after discharge from the combustion chamber and prior to contact thereof with an electrostatic precipitator.

BACKGROUND OF THE INVENTION

A dry process for removing sulfur dioxide from a gaseous mixture containing sulfur dioxide is described in U.S. Pat. No. 4,626,418, the contents of which are incorporated by reference herein. In that process, the gaseous mixture is contacted with a mixture of at least one alkaline earth compound, such as calcium or magnesium carbonate, hydroxide or oxide, and from about 0.01 to 12 weight percent of a sugar.

While the process described in U.S. Pat. No. 4,626,418 gives an appreciable increase in the removal of sulfur dioxide from flue gases due to the presence of sugar in the alkaline earth additive, when the flue gases are subsequently directed to an electrostatic precipitator, a high resistivity of the particles leaving the boiler system impairs the ability of the electrostatic precipitator to produce a clear, or unopaque, discharge.

It has previously been proposed, in U.S. Pat. No. 4,519,995, to increase the relative moisture of a flue gas, such as by passing the same through a heat exchanger and cooling the gas and/or by spraying water into the flue gas prior to passing the gas into a filter system. That system uses a dry additive, either fine-grain calcium oxide or calcium carbonate in the coal combustion chamber, and the cooling or water addition is effected between a boiler and a dust filter, with clean gas discharged through a stack following the filter. The provision of the dust filter after the firing is said to improve the binding rate of sulfur with the ashes, while the reactivity of sulfur is said to be further improved when the relative moisture of the flue gas is increased. The normal temperature of the gas is described as about 150° C. (300° F.), with the increase in the relative moisture reducing the temperature to a value between 50° and 100° C. (122° and 212° F.).

Another dry process for reducing the sulfur control of a flue gas is described in U.S. Pat. No. 4,670,238, wherein a dry sorbent is injected into the ductwork after a boiler. Calcium hydroxide, magnesium hydroxide, hydrated lime, or mixtures, and recycle sorbent are contacted with the flue gas following a preheater of a boiler. Downstream of the sorbent addition location, a humidifier is used to spray a solubilizing solution into the flue gas. The product stream is passed to a classifying electrostatic precipitator (ESP), from which unreacted lime as $CaOH_2$ is ground prior to recycle for addition as recycle sorbent.

In U.S. Pat. No. 4,645,652, a combined removal of $SO_x$ and $NO_x$ is disclosed, at two temperature levels, with additives injected into flue gas ductwork leading from a boiler to a particulate collection device such as a fabric filter baghouse or an electrostatic precipitator. A dry alkaline powder is first dispersed into the ductwork to remove $NO_x$ and some $SO_x$ at a temperature of 250° to 500° F. and subsequently an aqueous alkali slurry or humidification water is injected into the ductwork to remove $SO_x$ from the flue gas. A similar system is disclosed in U.S. Pat. No. 4,645,653 wherein a spray absorber is provided. In that process, $NO_x$ is removed from flue gas by adding a dry alkaline powder to the ductwork upstream from a spray absorber and $SO_x$ is removed from the flue gas by contact with an alkaline sorbent.

It is an object of the present invention to provide an improved sulfur dioxide removal process for treating flue gases with a calcium hydroxide - sugar mixture which will produce a clear discharge from an electrostatic precipitator of the system, further improve the sulfur dioxide removal, and reduce the exhaust of oxides of nitrogen into the air from the system.

SUMMARY OF THE INVENTION

A dry process for the removal of sulfur dioxide from flue gases, wherein the flue gases are contacted with hydrated lime containing sugar in a combustion unit and are then passed from the combustion unit to an electrostatic precipitator, through a conduit, prior to discharge to the atmosphere comprises adding water, or an aqueous solution of an alkali metal compound such as sodium hydroxide or sodium carbonate, to the flue gases in the conduit to increase the water content thereof and evaporatively cool the flue gas, while maintaining the flue gases above the dew point so as to prevent condensation of water therefrom.

BRIEF DESCRIPTION OF THE DRAWING

The drawing is a flow chart schematically illustrating the process of the present invention.

DETAILED DESCRIPTION

I have found that, in a coal fired steam generator apparatus having a steam boiler connected to an electrostatic precipitator for removal of finely divided particulate matter, and where a suspension of dry hydrated lime containing sugar is injected into the firebox to remove sulfur dioxide from the combustion gases, the sulfur dioxide removal and the particulate matter removal is appreciably increased if water or an aqueous solution of an alkali metal compound is sprayed into the ductwork that connects the steam boiler to the electrostatic precipitator.

Referring now to the drawing, the present process is schematically illustrated wherein a system 1 is provided for a steam generation system having sulfur dioxide removal. A conventional coal combustion unit 2 has a coal combustor 3a and boiler 3b. Coal is burned in combustor 3a to produce heat, with the resultant hot flue gases passing to the boiler 3b for the production of steam. From the coal combustion unit 2, the hot flue gases are passed through a conduit or duct 4 to an electrostatic precipitator 5. In the electrostatic precipitator 5, particulate matter is removed and the flue gases are then discharged through line 6. Coal is charged to the coal combuster through line 7 while dry hydrated lime containing sugar is charged into the system following substantial combustion of the coal, such as indicated at the boiler 3b, through line 8. Intermediate the coal combustion unit 2 and the electrostatic precipitator 5, a line 9 is provided which feeds water or an aqueous alkali solution from a source 10 thereof into the duct 4.

The combustion gases that are treated according to the present process are those normally produced during the burning of pulverized coal in a steam boiler. The gases generally contain, on a volume basis, from about 8 to 20 percent carbon dioxide, about 2 to 12 percent oxygen, about 0.10 to 0.35 percent sulfur dioxide, and from about 0.03 to 0.13 percent mixed oxides of nitrogen. These hot flue gases also contain substantial quantities of finely divided coal ash, fly ash, which must be removed therefrom The hot flue gas, which is usually at a temperature of about 980° to 1315° C. (about 1800° to 2400° F.) after substantially complete combustion of the coal is contacted, such as in a boiler firebox, with a suspension of dry hydrated lime which contains a sugar.

The hydrated lime must have a high specific surface area, one of about 7 to 25 square meters per gram, preferably about 18 to 24 m²/gr, and may contain up to about 10 percent magnesium hydroxide. The hydrated lime contains about 0.5 to 10.0 percent by weight, preferably about 1 to 3 percent by weight, of a sugar. The sugar that is added to the hydrated lime is a carbohydrate having a chain of 2 to 7 carbon atoms, such as is described in U.S. Pat. No. 4,626,418, the contents of which are incorporated by reference herein. Preferred sugars are the monosaccharides, such as glucose and fructose, and the higher saccharides, such as sucrose, maltose and lactose. The hydrated lime-sugar mixture may be produced by various known methods, but is preferably produced by adding an aqueous solution of sugar to soft burned quicklime and allowing the temperature to rise so as to produce a dry powder with the sugar or sugar lime product thoroughly dispersed throughout.

The amount of hydrated lime containing sugar that is added to the flue gases is an amount such that the mols of lime in the mixture relative to the amount of sulfur dioxide in the flue gas being treated is in the range of about 0.8:1 to about 2.0:1, and preferably in the range of about 1:1 to about 1.5:1.

After passage through various conventional heat exchange equipment in the boiler, the flue gases containing the lime-sugar mixture and coal ash leaves the boiler at a temperature in the range of about 140° to 195° C. (about 280° to 380° F.). These partially cooled flue gases are conducted by large ducts to the electrostatic precipitator where particulate matter is removed.

To the flue gases in the duct leading from the boiler to the electrostatic precipitator, which are at a temperature of between about 140° to 195° C., there is added an aqueous media, either water or a dilute aqueous solution of an alkali metal compound such as sodium hydroxide or sodium carbonate. The aqueous media is added to the flue gases in the ductwork as a fine spray or mist, and is in an amount sufficient to reduce the temperature of the flue gas to a temperature in the range of about 67° C. to 88° C. (about 135° to 190° F.) to partially humidify the gaseous mixture so as to remove additional sulfur dioxide and also decrease the electrical resistivity of the solid particles in the gaseous stream sufficiently so that they are readily removed therefrom in the electrostatic precipitator.

The amount of the aqueous media sprayed into the ductwork connecting the boiler to the electrostatic precipitator will vary dependant upon the composition of the coal being burned and the combustion conditions in the boiler. Such amount to be added is that required to cool the flue gases entering the electrostatic precipitator to within about 15° to 45° F. of the dew point of the gaseous mixture, but not so much as to cause condensation or discrete droplets of water to form. Preferably, the addition of the aqueous media cools the gases to a temperature no lower than 20° F. above the dew point of the gas. When sodium hydroxide or sodium carbonate are present in the aqueous media, the amount present therein should be between 1 to 50 percent by weight of the aqueous solution.

The present process would be expected to operate as follows, wherein the major portion of the sulfur dioxide resulting from combustion of coal would be removed in a combustion unit, such as the firebox of a boiler, at high temperature using hydrated lime with sugar added, followed by the further removal of sulfur dioxide at lower temperatures with the addition of water in the ductwork between the coal combustion unit and the electrostatic precipitator, followed by substantially complete removal of particulate matter in the electrostatic precipitator.

A dry hydrated lime and sugar mixture is prepared by dissolving sucrose in water, mixing the resultant solution with soft burned high calcium lime in an agitated mixer, allowing the temperature to rise and the small amount of moisture to leave the mixer in the form of steam, followed by cooling the solids to room temperature by natural means. The specific surface of the hydrated lime so produced is about 20 sq. meters per gram.

A gaseous mixture produced from the burning of bituminous coal and containing 0.155 weight percent of $SO_2$ is contacted by the lime mixture in the burner zone at a temperature of 2260° F. Following injection of the lime into the gas in a coal combustion unit, the $SO_2$ in the gas is reduced to 0.04 percent $SO_2$, or a removal of 74 percent of the $SO_2$. The amount of lime used is 1.26 mols of lime per mol of $SO_2$ in the untreated gas. The amount of sucrose used is 2.2 percent of the lime. The treated gas leaving the high temperature zone contains the residual $SO_2$ plus the unreacted lime, at a ratio of about 2 mols of lime per mol of residual $SO_2$. Since it is observed that the gases leaving the burner zone after indirect cooling to about 325° F. contain both fly ash and unreacted lime, which mixture has an electrical resistivity in the range of 3 to $4 \times 10^{12}$ ohms per cubic centimeter, which is too high to be fully removed in an electrostatic precipitator, 0.2 to 0.4 gallons of water per 1000 ACFM of gas is sprayed into the duct leaving the boiler to cool and partially humidify the gases to a temperature about 25° F. above the dew point of the gas, or about 145° to 160° F., without producing discrete droplets of water in the duct. This would result in a decrease of the electrical resistivity generally to $1 \times 10^{11}$ ohms per cubic centimeter, which is low enough to the point where an electrostatic precipitator could fully remove the particles of ash and lime. An increase in the removal of $SO_2$ is noted, of about 10 percent, thus raising the total $SO_2$ removal up to a total of about 84 percent. It is postulated that substituting a solution of sodium hydroxide or soda ash, in a concentration of from 1 to 50 weight percent, for the plain water in the ductwork would further decrease the amount of $SO_2$ remaining in the gas in the duct, so that the total $SO_2$ can be more than 90% removed.

What is claimed is:

1. In a dry process for the removal of sulfur dioxide from flue gases by the addition thereto of hydrated lime containing sugar in a coal combustion unit, wherein the flue gases result from the combustion of coal in a combustion chamber, and the flue gases are treated in an electrostatic precipitator prior to discharge to the atmosphere, the improvement comprising:

passing said flue gases, after the addition of said hydrated lime containing sugar, wherein said hydrated lime is of fine particles of a specific surface of 7 to 25 square meters per gram, through a conduit towards said electrostatic precipitator; and adding an aqueous media to said flue gases in said conduit in an amount to increase the water content of the flue gases and cool the same by evaporative cooling to a temperature no lower than 20° F. above the dew point of the gas, so as to avoid forming water droplets in the gas, so as to prevent condensation of water therefrom.

2. The improvement defined in claim 1 wherein said aqueous media is water containing from 1 to 50 percent by weight of an alkali metal compound selected from the group consisting of sodium hydroxide and sodium carbonate.

3. The process of claim 1 where the sugar content of the hydrated lime is from 0.5 to 10.0 weight percent sugar, and the sugar is selected from the group consisting of glucose, fructose, sucrose, maltose, lactose, and mixtures thereof.

4. The process of claim 1 where the mixture of hydrated lime and sugar is obtained by adding a water solution of sugar to soft burned quicklime in a mixer and allowing the temperature to rise to drive off excess water and produce a dry powder of very fine particle size.

5. The process of claim 1 wherein the aqueous media added in the ductwork is in the form of a fine spray or mist.

6. The process of claim 2 wherein the aqueous media containing sodium hydroxide or sodium carbonate added in the ductwork is in the form of a fine spray or mist.

* * * * *